United States Patent

Miyazaki et al.

[11] Patent Number: 5,634,673
[45] Date of Patent: Jun. 3, 1997

[54] JOINT DEVICE

[75] Inventors: Hidekazu Miyazaki; Tamio Asano; Takeshi Miyazaki; Terumitu Oshima, all of Aichi, Japan

[73] Assignee: Toyoda Gosei Co., Ltd., Aichi, Japan

[21] Appl. No.: 413,154

[22] Filed: Mar. 29, 1995

[30] Foreign Application Priority Data

Mar. 29, 1994 [JP] Japan .................................. 6-059472
Nov. 29, 1994 [JP] Japan .................................. 6-295005

[51] Int. Cl.$^6$ ...................................................... F16L 3/04
[52] U.S. Cl. ........................ 285/162; 285/46; 285/179; 285/286; 285/330; 285/906; 285/921
[58] Field of Search .................................. 285/305, 319, 285/330, 921, 162, 46, 179, 286, 906

[56] References Cited

U.S. PATENT DOCUMENTS

| | | | |
|---|---|---|---|
| 3,149,362 | 9/1964 | Smithson | 285/305 X |
| 3,245,703 | 4/1966 | Manly | 285/319 |
| 3,929,356 | 12/1975 | Devincent et al. | |
| 4,431,218 | 2/1984 | Paul et al. | 285/305 X |
| 4,778,203 | 10/1988 | Bartholomew | 285/319 X |
| 4,844,515 | 7/1989 | Field | 285/305 |
| 4,884,829 | 12/1989 | Funk et al. | 265/305 X |

FOREIGN PATENT DOCUMENTS

| | | | |
|---|---|---|---|
| 3825866 | 2/1990 | Germany | 285/319 |
| 3924173 | 1/1991 | Germany | 285/319 |
| 3490571C2 | 12/1993 | Germany . | |
| 1071978 | 6/1967 | United Kingdom | 285/319 |

*Primary Examiner*—Dave W. Arola
*Attorney, Agent, or Firm*—Cushman Darby & Cushman, IP Group of Pillsbury Madison & Sutro LLP

[57] ABSTRACT

The pipe 1 includes in one end portion thereof a metal cap portion 2 on which an O-ring 5 can be mounted, and a connecting portion 6 in the other end portion. A delivery pipe 9 includes a communication hole having an undercut shape and an engaging recessed portion 21. A fixing clip 21 including a mounting portion 16 and a securing portion 17 having rigidity is mounted on the portion of the pipe 1 located just above the metal cap portion 2. The securing portion 17 includes a plurality of securing claws 18 so arranged as to surround the metal cap portion 2, and a rotation preventive projection 19. When the metal cap portion 2 is fitted into the communication hole 12, the securing claws 18 are secured to the upper hole portion 14 of the communication hole 12, and the rotation preventive projection 19 is engaged with the engaging recessed portion 21. The metal cap portion 2 is fixed in such a manner that the securing claws 18 surround at least the metal cap portion 2 and the securing portion 17 can be made relatively short. Due to this, the metal cap portion 2 itself can be fixed so strongly that it can be prevented from wobbling even a stress is applied to the pipe 1.

10 Claims, 11 Drawing Sheets

JOINT DEVICE

BACKGROUND OF THE INVENTION

1. Field of the Invention

The present invention relates to a joint device and, in particular, to a joint device which is used to connect a hose for fuel supply with a delivery pipe and to a simple and easy hose joint structure which can be assembled with no use of tools.

2. Description of the Conventional Art

In recent years, in an automotive engine, there has been used a electronic control fuel injection device which controls the supply of fuel by use of a computer.

In the electronic control fuel injection device, the computer inputs signals relating to the amount of air inhaled, the number of revolutions of the engine or engine speed, the water temperature, the temperature of the inhaled air, the degree of opening of a throttle, the oxygen density in the exhaust air and the like, and the computer also operates and outputs the optimum amount of injection of the fuel corresponding to the running conditions. And, in accordance with the control signals from the computer, injectors provided in the respective cylinders are controlled so that the fuel can be injected into the respective cylinders from the injectors with the optimum fuel injection amounts. This can improve the fuel efficiency, purify the exhaust gas, and improve the drivability.

The delivery pipe holds the respective injectors together, has a function to distribute the fuel to be supplied from a fuel pump to the respective injectors, and is fixed to the neighborhood of the engine and is use there.

Figure 1:
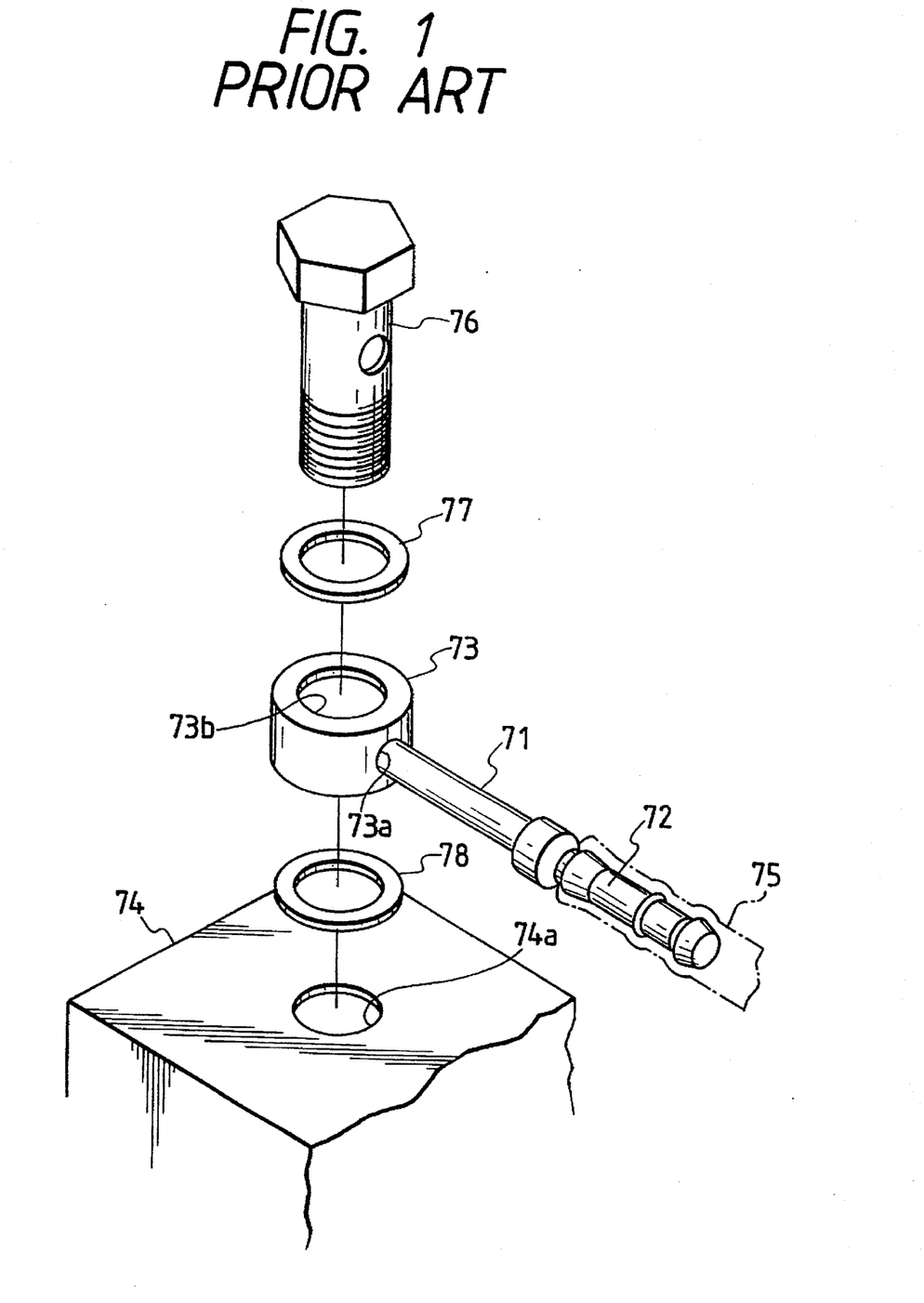
FIG. 1 is an exploded, perspective view of a joint device according to the prior art.

To one end of this delivery pipe 74, as shown in FIG. 1, there is fixed a hose 75 which is connected to the fuel pump through an ring joint 73, gaskets 77 and 78, and a bolt 76. The fuel that is supplied from the hose 75 is allowed to pass from the ring joint 73 through a fuel passage formed in the delivery pipe 74, and is distributed into the respective injectors.

Specifically, as shown in FIG. 1, in a conventional joint device, there is used a so called ring union. In the ring union, one end of a pipe 71 is connected with a nipple 72, while the other end of the pipe 71 is connected with a side hole 73a formed in the side surface of a ring 73. The nipple 72 and ring 73 are manufactured by machining and they are strongly jointed by brazing to the pipe 71. Also, a fuel hose 75 is connected to the pipe 71 through the nipple 72. Further, in the central portion of the ring 73, there is opened up a central hole 73b which is in communication with the side hole 73a as well. And, use of the ring 73 allows the ring union to be connected to the delivery pipe 74.

In particular, a bolt with a hole 76 is positioned in the central hole 73b of the ring 73, that is, in the upper portion of a communication hole 74a formed in the delivery pipe 74. And, the bolt with a hole 76 is threadedly engaged with the communication hole 74a of the delivery pipe 74, whereby the ring union can be strongly fixed to the delivery pipe 74. Two rotation preventive plates (not shown) are separately mounted on the side surface of the ring 73 and on one side surface of the delivery pipe 74, so that the relative rotation between the ring 73 and delivery pipe 74 can be restricted by the rotation preventive plates. And, fuel from a fuel tank (not shown) is supplied from the fuel hose 75 through the nipple 72 and pipe 71 to the ring 73, and is then guided through the interior of the bolt with a hole 76 into the delivery pipe 74 and finally into an injector.

Figure 2:
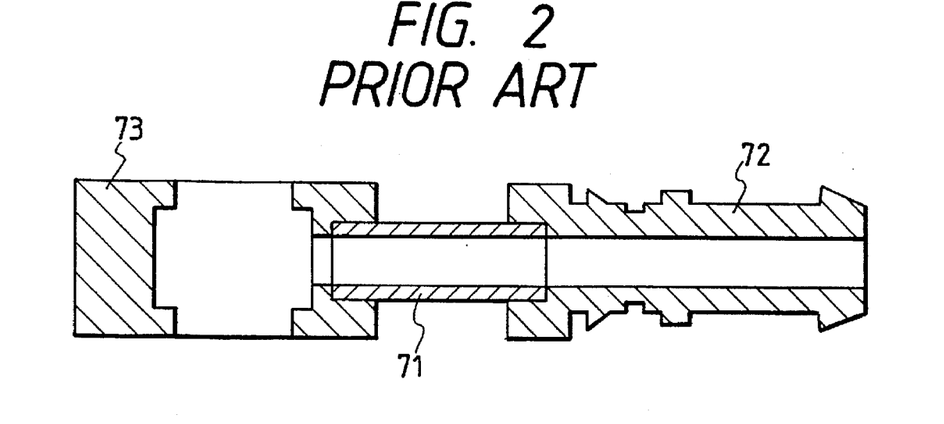
FIG. 2 is a section view of a ring joint used in the conventional hose joint structure.

However, in the above-mentioned conventional joint device, it takes much time and labor to manufacture the ring union. That is, the ring 73 and nipple 72 require operations to cut or machine their rod materials. Also the ring 73 and pipe 72 require a jointing operation such as a brazing operation or the like as shown in FIG. 2. Further, in order to connect the ring union with the delivery pipe 74, there are necessary many parts such as the bolt with a hole 76 and the like, which results in the high costs. In addition, parts such as the rotation preventive plates and the like must be separately mounted to prevent the relative rotation between the ring 73 and delivery pipe 74.

Further, to connect the ring joint 73 to the delivery pipe 74, it is necessary to fasten the bolt 76, that is tools such as a spanner and the like are necessary, which increases the man-hours for assembly.

Figure 3:
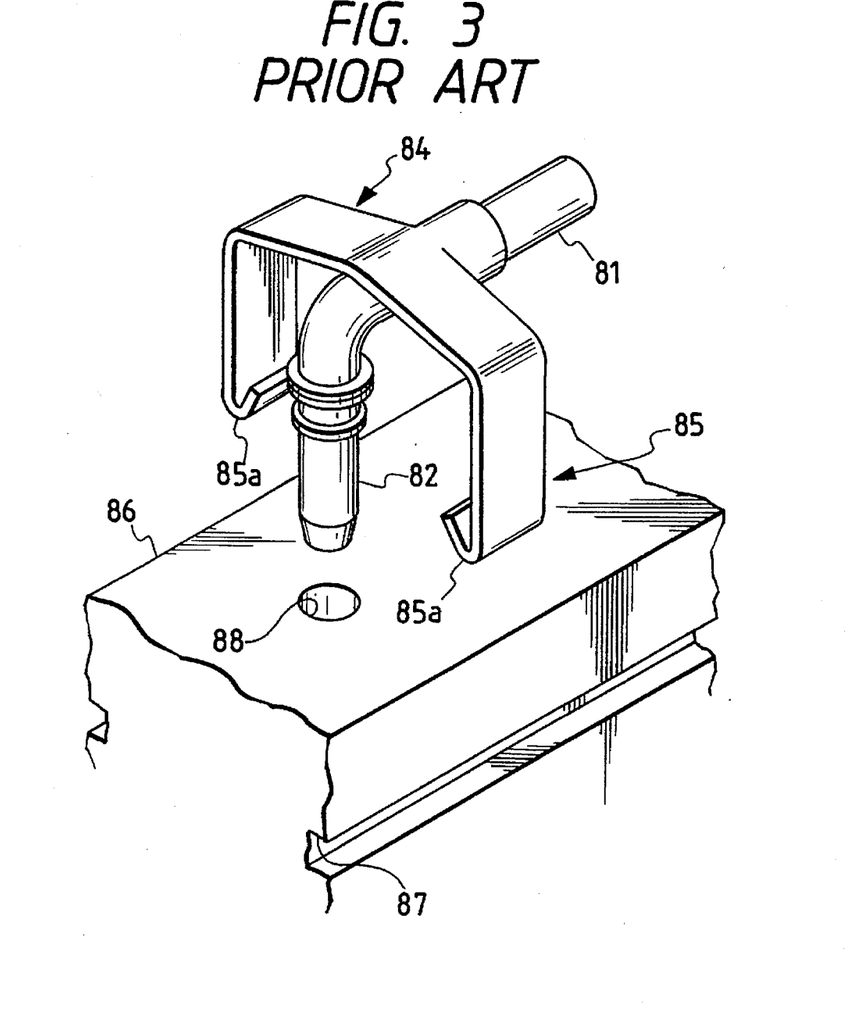
FIG. 3 is a perspective view of the above conventional joint device.

As a technique to solve the above-mentioned drawbacks, for example, there is known a technique which is disclosed in Unexamined Japanese Patent Publications (Kokai) 6-50468 and 6-50469. In this technique, as shown in FIG. 3, a pipe 81 is bent formed in a substantially right-angled shape, a metal cap portion 82 is formed in one end of the pipe 81, and a hose connecting portion (not shown) is formed in the other end thereof. A fixing clip 84 is mounted on a given portion of the pipe 81 in the neighborhood of the metal cap portion 82. The fixing clip 84 includes two securing portions 85 on both sides thereof and two claws 85a are formed integrally with the respective lower ends of the securing portions 85. Also, if the claws 85a are secured to the hitch portions 87 of a delivery pipe 86 and the metal cap portion 82 is fitted into a communication hole 88 formed in the delivery pipe 86, then the pipe 81 can be fixed to the delivery pipe 86. As a result of this, the pipe 81 can be positioned with respect to the delivery pipe 86 in the vertical direction and in the horizontal direction.

The above-mentioned conventional technique not only can omit the machining step and the brazing operation but also can reduce the number of parts. As a result of this, a mounting operationability can be improved remarkably as well as the cost of the joint device can be reduced.

However, in the above-mentioned conventional technique, the portion of the pipe 81 to be fixed by the fixing clip 84 is sometimes different from the position of the metal cap portion 82 to be fitted into the communication hole 88. That is, in come cases, the metal cap portion 82 itself is not fixed. For this reason, when a stress is applied to the pipe 81, then there is a danger that the metal cap portion 82 can be caused to wobble due to the stress applied.

Also, in the conventional technique, the claws 85a of the securing portions 85 respectively extending on the two sides of the fixing clip 84 are hitched on the hitch portions 87 of the delivery pipe 86 having a given width, thereby fixing the fixing clip 84. For this reason, the distance between the mounting portion of the fixing clip 84 to the pipe 86 and the claw 85, that is, the securing portion 85 itself is relatively long. Thus, when a stress is applied to the pipe 81, then the securing portions 85 are flexed to thereby cause the pipe 81 to wobble.

SUMMARY OF THE INVENTION

The present invention aims at eliminating the above-mentioned problems found in the conventional technique. Accordingly, it is an object of the invention to provide a joint device connected to a mating member through a pipe, which not only can improve the operationability thereof and reduce the cost thereof but also can fix the metal cap portion of the pipe positively to thereby prevent the pipe including the metal cap portion from wobbling. Further, it is an object of the invention to provide a hose joint structure which can be assembled without using any tool such as a spanner or the like, and can also be manufactured easily.

In attaining the above object, according to the first aspect of the invention, there is provided a joint device which comprises a pipe including a metal cap portion at least at one end thereof, a mating part including a communication hole into which the metal cap portion can be fitted, a sealing member provided in the outer periphery of the metal cap portion of the pipe or in the inner periphery of the communication hole of the mating part for closely connecting the metal cap portion and the communication hole to each other, and fixing means including a mounting portion mounted to the neighborhood of the metal cap portion of the pipe and a securing portion extending from the mounting portion in a manner to put the metal cap portion between the respective sections thereof or surround the same, the securing portion being able to position and fix the communication hole of the mating part and the metal cap portion in the vertical direction as well as in the horizontal direction, characterized in that the communication hole is formed in an undercut shape, an engaging recessed portion is formed in a position different from the communication hole of the mating part, the securing portion is formed of material having a given rigidity and is composed of a plurality of securing claws extending in a manner to put the metal cap portion therebetween or surround the same and a rotation preventive projection engageable with the engaging recessed portion, the securing claws are engaged with the undercut-shaped communication hole, and the rotation restrict projection is engaged with the engaging recessed portion.

A metal cap portion is formed at least in one end portion of the pipe. A sealing member is provided in the outer periphery of the metal cap portion of the pipe or in the inner periphery of a communication hole formed in a mating part and provision of the sealing member allows the metal cap portion and communication hole to be contacted closely with each other when the metal cap portion is fixed to the communication hole. Also, the mounting portion of the fixing means is mounted to the neighboring portion of the metal cap portion of the pipe. And, when the metal cap portion is fitted into the communication hole, the metal cap portion is fixed in such a manner that at least the metal cap portion is put between or surrounded by the respective portions of the securing portion extending from the mounting portion. After then, the communication hole of the mating part and the metal cap portion are positioned and fixed in the vertical and horizontal directions.

Therefore, since there are eliminated not only the need for provision of parts such as a bolt with a hole and the like but also the need for a threadedly engaging operation and the like, and number of parts as well as the man-hours for the operations can be reduced. Also, because the metal cap portion is fixed by the securing portions in such a manner that at least the metal cap portion is put between or surrounded by the respective portions of the securing portion, the metal cap portion itself is fixed and thus, even if a stress is applied to the pipe, the metal cap portion is prevented from wobbling.

Also, since the engaging claws of the securing portion is engaged with the communication hole formed in an undercut shape, the movement of the metal cap portion itself in the vertical direction can be prevented. And, because the rotation preventive projection of the securing portion is engaged with the engaging recessed portion of the mating part, the fixing means is prevented against rotation. Therefore, the distance between the mounting portion and the securing claw at the leading end of the securing portion can be minimized. Moreover, the securing portion has a given rigidity. For this reason, even if a stress is applied to the pipe, since the securing portion is flexed, the metal cap portion and the like can be prevented from wobbling.

Further, according to the second aspect of the invention, there is provided a joint device, in which the mounting portion of the fixing means is fixed by staking to the pipe or is fixed by two increased diameter portions respectively formed integral with the pipe in the upper and lower portions of the mounting portion.

The mounting portion is fixed by staking to the pipe or is fixed to the pipe by the increased diameter portions respectively formed integrally with the pipe at the upper and lower positions of the mounting portion. For this reason, even if a fixing operation such as a brazing operation or the like is not performed, the fixing means can be fixed to the pipe easily and positively.

Further, according to the third aspect of the invention, there is provided a joint device, in which a bent portion is formed in the pipe and at least the bent portion is so formed as to have a substantially square section.

A bent portion is formed in the pipe and at least the bent portion is so formed as to have a substantially square section. Due to this, even if the radius of curvature of the bent portion is small, the pipe is difficult to break, thereby being able to secure a sufficient space area.

Moreover, according to the fourth aspect of the invention, there is provided a joint device, in which the pipe includes a dust cover for covering the fixing means.

The dust cover prevents foreign substances such as refuse, dust and the like from entering the interior of the communication hole.

Furthermore, according to the fifth aspect of the invention, there is provided a hose joint structure comprising a hose with a pipe fastened thereto and a mating member with the leading end of the pipe inserted and fixed thereto, in which the pipe includes a flange portion formed at a position spaced backwardly by a given distance apart from the leading end thereof, a stopper held by the mating member and engageable with the flange portion to hold the pipe in the mating member in such a manner that the pipe is energized in a direction to advance into the mating member, an elastic bush interposed between the flange portion and mating member and pressable by the flange portion due to the energization force against the mating member to thereby store an elastic repulsive force therein, and a ring-shaped elastic sealing member interposed between the outer peripheral surface of the pipe leading end and the inner peripheral surface of the mating member, and also in which the flange portion is held by and between the elastic bush and stopper, whereby the pipe can be connected to the mating member.

In constructing a hose joint structure according to the fifth aspect of the invention, at first, an elastic sealing member such as an O-ring or the like is mounted on one of the outer peripheral surface of the pipe leading end and the inner peripheral surface of the mating member. Also, an elastic bush is inserted into the pipe from the leading end thereof, or the elastic bush is inserted into the mating member. Then, the pipe is inserted into the mating member, the elastic sealing member is held by and between the outer peripheral surface of the pipe and the inner peripheral surface of the mating member and is elastically contacted with these two surfaces, and the flange portion is pressed against the elastic bush in the axial direction to thereby elastically contact the same with the mating member, so that the elastic bush can be elastically deformed.

In this condition, if the stopper is engaged with the flange portion and the pipe is thereby held by the mating member, then the flange portion is kept pressed against the elastic bush by the stopper, so that the flange portion is kept held by and between the stopper and elastic bush.

In the hose joint manufactured in this manner, the elastic sealing member can seal between the pipe and mating member in a liquid tight manner and the pipe can be held by the mating member through the elastic bush, thereby being able to damp the vibration of the hose joint.

DETAILED DESCRIPTION OF PREFERRED EMBODIMENTS

Figure 4:
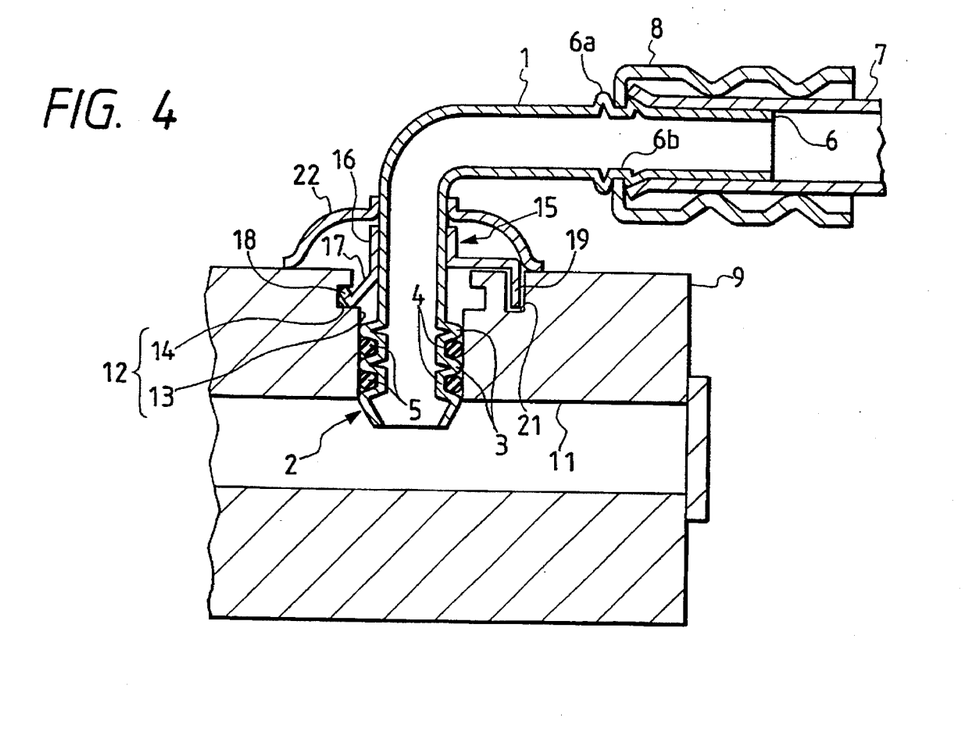
FIG. 4 is a section view of an embodiment of a joint device according to the invention.

Now, description will be given hereinbelow of an embodiment of a joint device according to the invention with reference to FIGS. 4 to 14. FIG. 4 is a section view of a joint device according to the present embodiment. Reference character 1 designates a pipe having a circular section, and a metal cap portion 2 is formed in one end portion of the pipe 1. The metal cap portion 2 includes crown portions 3 and valley portions 4 respectively formed by beading. Also, O-rings 5, which are respectively formed of rubber and serve as sealing members, are mounted on the valley portions 4 respectively. On the other hand, a connecting portion 6 is formed in the other end portion of the pipe 1. The connecting portion 6 also includes crown portions 6a and valley portions 6b. To the connecting portion 6, there is connected a fuel hose 7 which is in communication with a fuel tank (not shown), and a sleeve 8 is staked and fixed to the outer periphery of the connecting portion 6. And, the pipe 1 is bent in the middle portion thereof at substantially right angles.

In the present embodiment, a delivery pipe 9, which serves as a mating part, is formed in a substantially rectangular parallelepiped. The delivery pipe 9 includes therein a communication passage 11 which is in communication with an injector (not shown) and, in the upper portion of the delivery pipe 9, there is opened up a communication hole 12 which is open to the communication passage 11. The communication hole 12 includes a lower hole portion 13 having a diameter almost equal to the outside shape of the crown portions of the metal cap portion 2, and an upper hole portion 14. And, the upper hole portion 14 is situated upwardly of the lower hole portion 13, includes a portion having a diameter larger than the lower hole portion 13, and has an undercut shape. When the metal cap portion 2 of the pipe 1 is fitted into the communication hole 12, then the pipe 1 can be connected and fixed to the delivery pipe 9.

Figure 7:
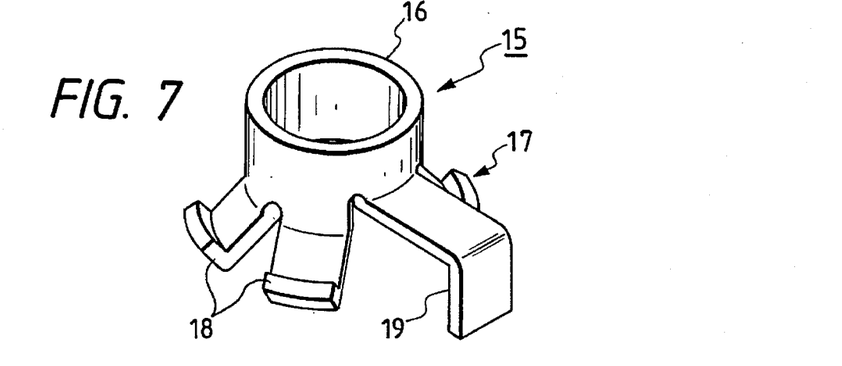
FIG. 7 is a perspective view of a fixing clip employed in the above embodiment.
Figure 13:
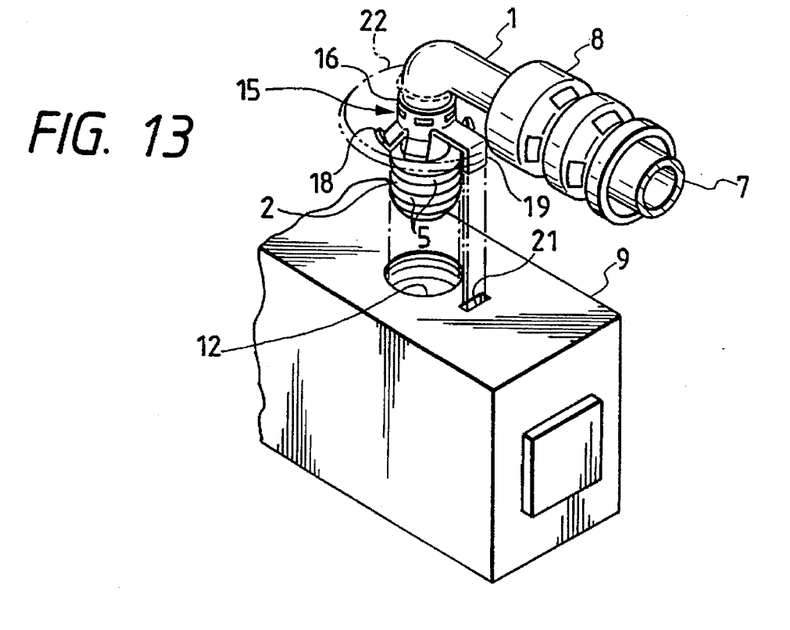
FIG. 13 is a perspective view of a pipe assembly and a delivery pipe employed in the embodiment of a joint device according to the invention, showing an operation to fix the pipe assembly to the delivery pipe.

Next, description will be given below in detail of the connecting structure for connecting the pipe 1 to the delivery pipe 9. As shown in FIGS. 4, 7 and 13, a fixing clip 15 formed of spring steel and serving as fixing means is mounted on the portion of the pipe 1 that is situated just above the metal cap portion 2. Describing this in more detail, the fixing clip 15 having a given rigidity includes a mounting portion 16 staked and fixed to the pipe 1 and a securing portion 17 extending from the mounting portion 16 in a downwardly widening manner. Also, the securing portion 17 includes a plurality of (in the present embodiment, four) securing claws 18 each having a substantially V shape, and a hook-shaped rotation preventive projection 19. Further, the securing claws 18 are arranged in a manner to surround the metal cap portions and, especially, the centers of the securing claws 18 are coincident with the axis of the metal cap portion 2.

On the other hand, the delivery pipe 9, in the portion thereof different from the communication hole 12 formed in the upper surface thereof, includes an engaging recessed portion 21 which is substantially coincident in shape with the end face of the rotation preventive projection 19.

And, in the present embodiment, the securing claws 18 are respectively secured to the upper hole portion 14 of the communication hole 12, while the rotation preventive projection 19 is engaged with the engaging recessed portion 21 of the delivery pipe 9.

Further, on the portion of the pipe 1 situated just above the fixing clip 15, there is mounted a dust cover 22 formed of rubber in such a manner that it covers the fixing clip 15.

Figure 5:
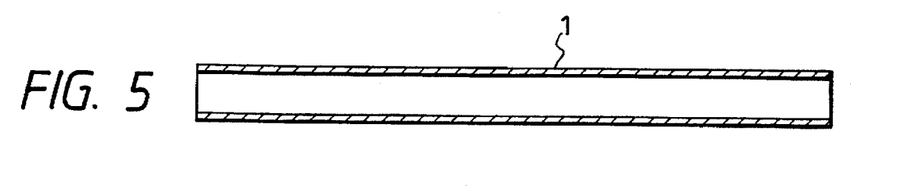
FIG. 5 is a section view of a pipe, showing a first step of a procedure for manufacturing the embodiment of a joint device according to the invention.
Figure 6:
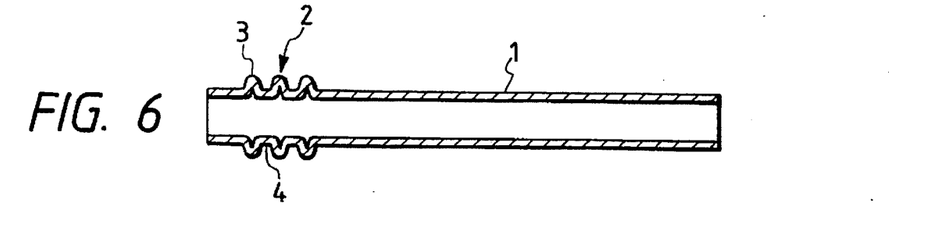
FIG. 6 is a section view of the pipe, showing a second step of the procedure for manufacturing the embodiment of a joint device according to the invention.
Figure 8:
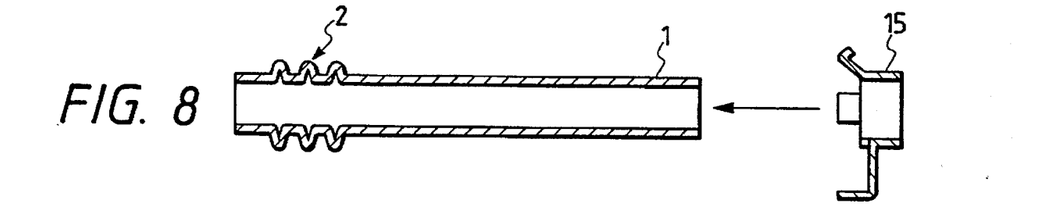
FIG. 8 is a section view of the pipe and fixing clip, showing a procedure for manufacturing the embodiment of a joint device according to the invention.
Figure 9:
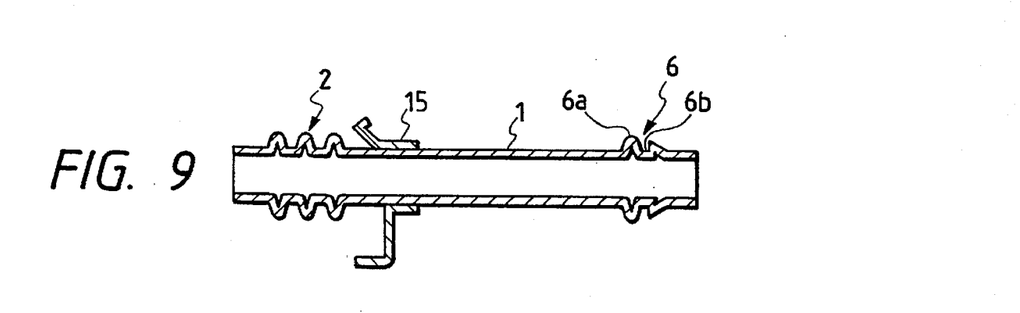
FIG. 9 is a section view of the pipe and the like, showing a procedure for manufacturing the embodiment of a joint device according to the invention.

Next, description will be given below in detail of a method of manufacturing a hose joint device according to the present embodiment as well as a method of connecting the same. As shown in FIG. 5, there is prepared the pipe 1 in which nothing is formed. And, as shown in FIG. 6, the one end side of the pipe 1 is machined by beading to thereby form the crown portions 3 and valley portions 4, that is, the metal cap portion 2. Next, as shown in FIG. 8, the fixing clip 15 is fitted into the pipe 1 from the other end side of the pipe 1. After then, as shown in FIG. 9, the other end side of the pipe 1 is machined by beading to thereby form the crown portions 6a and valley portions 6b, that is, the connecting portion 6.

Figure 10:
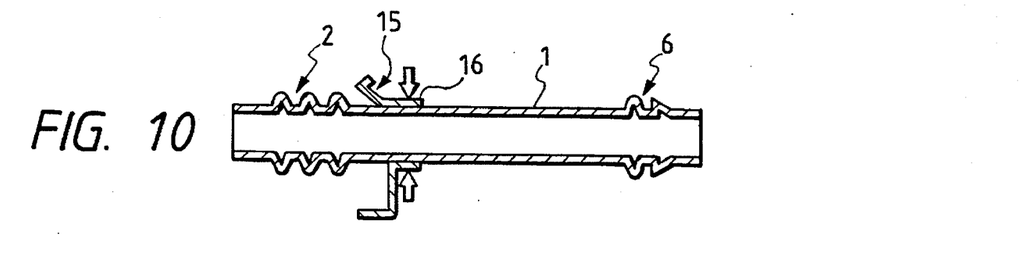
FIG. 10 is a section view of the pipe and the like, showing a procedure for manufacturing the embodiment of a joint device according to the invention and, in particular, showing a state in which the mounting portion of the fixing clip is fixed staking.
Figure 11:
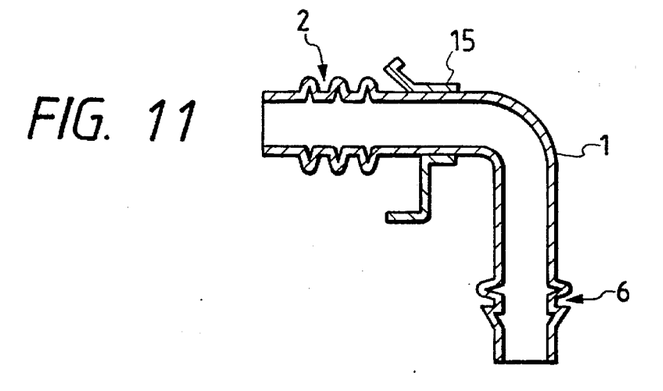
FIG. 11 is a section view of the pipe and the like, showing a procedure for manufacturing the embodiment of a joint device according to the invention and, in particular, showing a state in which the pipe is bent.
Figure 12:
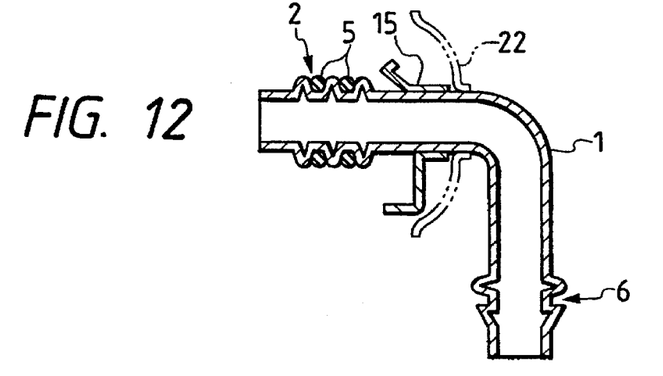
FIG. 12 is a section view of the pipe and the like, showing a procedure for manufacturing the embodiment of a joint device according to the invention and, in particular, showing a state in which an O-ring and the like are mounted on the pipe.

Next, as shown in FIG. 10, the mounting portion 16 of the fixing clip 15 is staked to thereby fix the fixing clip 15 to the pipe 1. And, as shown in FIG. 11, the pipe 1 is bent in a substantially right-angle manner. After then, as shown in FIG. 12, that O-rings 5 are respectively mounted on the valley portions 4 of the metal cap portion 2 as well as the dust cover 22 is mounted on the pipe 1. In this manner, a pipe assembly is produced.

Then, the pipe assembly is fixed to the delivery pipe 9. That is, as shown in FIGS. 4 and 13, the metal cap portion 2 is fitted into the communication hole 12 so that the rotation preventive projection 19 of the securing portion 17 can be engaged with the engaging recessed portion 21 of the delivery pipe 9. As a result of this, the securing claws 18 of the securing portion 17 are guided from the upper side of the communication hole 12 and are then secured by the undercut shape of the upper hole portion 14. Also, the rotation preventive projection 19 is engaged with the engaging recessed portion 21. Further, the O-rings 5 are contacted closely with the inner peripheral surface of the lower hole portion 13 of the communication hole 12, thereby being able to seal between the metal cap portion 2 and the communication hole 12. At the same time, the lower end face of the dust cover 22 is contacted with the upper surface of the delivery pipe 9 and is then flexed. As a result of this, the fixing clip 15 is covered with the dust cover 22.

Here, the fuel hose 7 and sleeve 8 can be mounted any time after the connecting portion 6 is formed.

As described above, according to this embodiment, as the pipe assembly can be produced by beading, bending and by similar operations, there is eliminated the need for the cutting operation that has been described in connection with the conventional technique. Also, there is eliminated the need for the connecting operation such as the brazing operation or the like. Further, since the pipe 1 is fixed to the delivery pipe 9 by use of the fixing clip 15, there is avoided the need for use of parts such as the bolt with a hole used in the conventional technique. At the same time, the rotation of the pipe 1 can be prevented simply by means of engagement of the rotation preventive projection 19 with the engaging recessed portion 21. This eliminates the need to mount special parts such as a rotation preventive plate and the like separately.

Thanks to the above-mentioned devices, the present embodiment is able to reduce the operation man-hours which are necessary to produce the joint device and is thereby able to improve the operationability thereof to a great extent. Also, the number of parts can be reduced and thus the cost of the joint device can be reduced remarkably.

Further, due to the fact that the metal cap portion 2 is fixed by the securing claws 18, that is, at least the metal cap portion 2 is fixed in such a manner that it is surrounded by the securing claws 18, the metal cap portion 2 itself is fixed and, therefore, even if a stress is given to the pipe 1, the metal cap portion 2 is prevented from wobbling. As a result of this, the metal cap portion 2 can be fixed positively. In addition, according to the present embodiment, since the centers of the respective securing claws 18 are coincident with the axis of the metal cap portion 2, the stresses that are applied by the securing claws 18 can be balanced. As a result of this, the fixing of the metal cap portion 2 can be made further positive.

Moreover, according to this embodiment, since the securing claws 18 of the securing portion 17 are secured to the upper hole portion 14 of the communication hole 12 formed in an undercut shape, the movement of the metal cap portion 2 in the vertical direction can be prevented. For this reason, the distance between the mounting portion 16 and the securing claw 18 at the leading end of the securing portion 17 can be minimized unlike the prior art technique. Also, the securing portion 17 has a given rigidity. Due to this, even if any stress is given to the pipe 1, the securing portion 17 can be flexed to thereby prevent the metal cap portion 2 from wobbling. As a result of this, the fixing of the pipe 1 can be made further positive.

In addition, according to the present embodiment, the fixing clip 15 is covered with the dust cover 22 mounted on the pipe 1. Because of this, it is possible to prevent entry of foreign matters such as dust, refuse and the like into the interior of the communication hole 12, thereby being able to prevent the foreign matters from attaching to the O-rings 5. As a result of this, it is possible to prevent production of troubles which would be caused by the entrance of the foreign matters.

Figure 14:
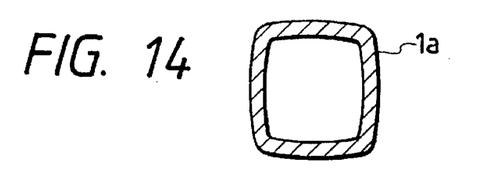
FIG. 14 is a section view of a pipe employed in a second embodiment of a joint device according to the invention.

Now, according to the present invention, the following embodiments or modifications are also possible without departing from the scope of the invention:

In the above-mentioned embodiment, the pipe 1 is so formed as to have a circular section. However, this is not limitative but, as shown in FIG. 14, at least the section of the bent portion 1a bent in a substantially right-angle manner can be formed to be a substantially square-shaped section. With use of such structure, even if the radius of curvature of the bent section of the bent portion 1a is small, the pipe 1 is hard to crash and thereby provide a sufficient space. And, when the radius of curvature is made small in this manner, then the space to be occupied by the pipe 1 can be reduced to thereby reduce the size of the whole hose joint device. Of course, the section of the whole of the pipe 1 can also be made substantially square.

Figure 15:
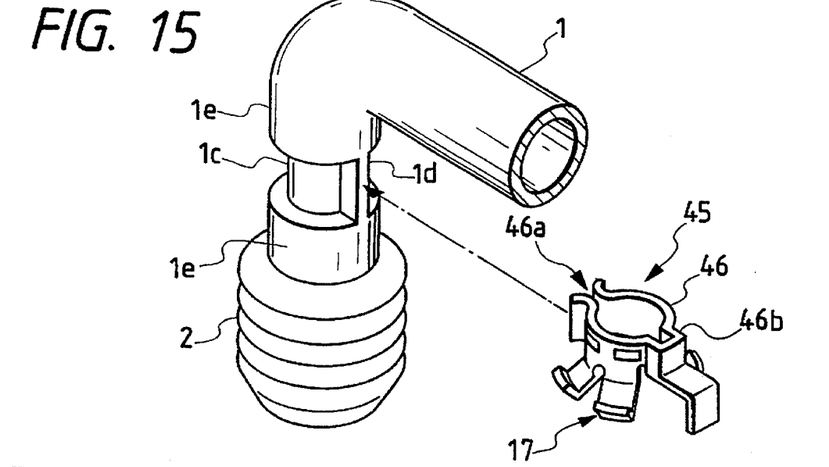
FIG. 15 is a perspective view of a second embodiment of a joint device according to the invention.

Although in the above-mentioned embodiment there is used, as the fixing means, the fixing chip 15 which includes the cylindrical mounting portion 16, there can also be used such a fixing clip 45 as shown in FIG. 15. That is, the mounting portion 46 of the fixing clip 45 includes an opening 46a having an open one end and a rotation preventive portion 46b having an almost U-shaped section. On the other hand, in the pipe 1, there are included a small diameter part 1c and a rotation preventive projection 1d which are previously formed by staking.

And, if the fixing clip 45 is fitted from the opening 46a side thereof in a direction shown by an arrow in FIG. 15, then the fixing clip 45 can be mounted onto the small diameter portion 1b of the pipe 1. Just above and below the mounting portion 46 of the thus mounted fixing clip 45, there exist two increased diameter portions 1e each having a diameter larger than the small diameter portion 1c. For this reason, the vertical movements of the fixing clip 45 are prevented by the increased diameter portions 1e. Also, since the rotation preventive portion 46b of the fixing clip 45 is fitted into the rotation preventive projection 1d, the rotation of the fixing clip 45 is also prevented. In this manner, unlike the above embodiment in which the cylindrical mounting portion 16 is used and the fixing clip must be fitted in the longitudinal direction of the pipe 1, in this embodiment, the fixing clip 45 can be mounted to the pipe 1 from a direction perpendicular to the pipe 1. This can stuck further simplify the mounting operation.

Figure 16:
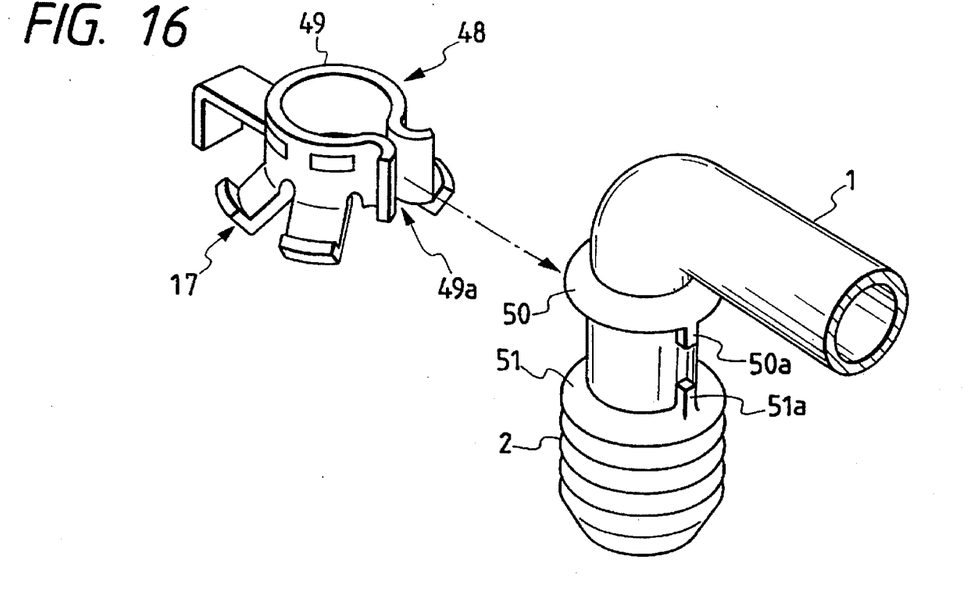
FIG. 16 is a perspective view of a third embodiment of a joint device according to the invention.
Figure 17:
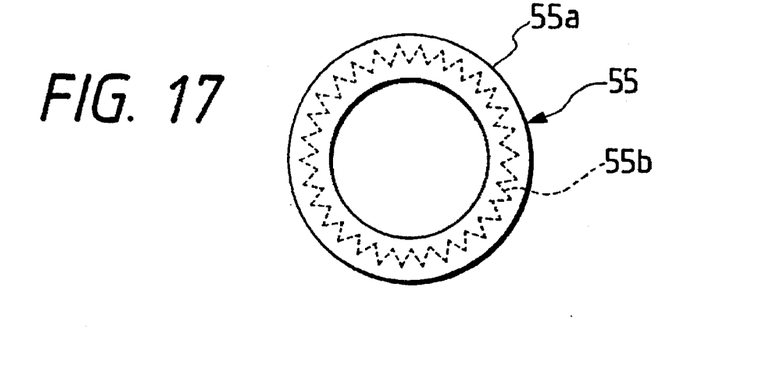
FIG. 17 is a plan view of another embodiment of a sealing member employed in the invention.

As a modification of the above-mentioned embodiment, there can be used such a fixing clip 48 as shown in FIG. 16. In particular, the fixing clip 48 include a mounting portion 49. The mounting portion 49 in turn includes an opening 49a which has a substantially C-shaped plane and also which is open at one end thereof. However, in the present modification, there is omitted the rotation preventive portion 46b which is provided in the above-mentioned modification and the opening width of the opening 49a is set very small. On the other hand, in the pipe 1, there are provided by beading a pair of crown portions 50 and 51 serving as a pair of upper and lower increased diameter portions, and a pair of projections 50a and 51a respectively extending in the downward and upward directions from the crown portions 50 and 51. The projections 50a and 51a respectively have a width substantially equal to that of the opening 49a.

And, if the fixing clip 48 is fitted from the opening 49a side thereof in a direction shown by an arrow in FIG. 16, then the fixing clip 48 can be mounted between the crown portions 50 and 51 of the pipe 1. The movement of the mounting portion 49 of the thus mounted fixing clip 48 in the vertical direction can be prevented due to the existence of the crown portions 50 and 51. Also, since the opening 49a is just fitted into the projections 50a and 51a, the fixing clip 48 can also be prevented against rotation. This modification can also provide an effect substantially similar to the above-mentioned modification.

Although in the illustrated embodiments the securing portion 17 is composed of four securing claws 18 and a rotation preventive projection 19, the number of the securing claws 18 may be different from four, provided that the number is two or more. Also, two or more rotation preventive projections may be employed. Further, the shapes of these components are not limited to those employed in the illustrated embodiments at all.

Although in the illustrated embodiments there are employed O-rings as sealing members, the following sealing members may also be used instead of such O-ring:

There can be used such an O-ring 55 as shown in FIG. 14. The O-ring 55 includes a ring main body 55a formed of rubber and spring 55b embedded in the ring main body 55a. With use of this structure, when compared with an O-ring formed of only rubber, the spring 55b increases the expansion and contraction force of the O-ring 55 and thus the fastening force of the O-ring 55 is increased, which can enhance the sealing property of the O-ring 55.

Figure 18:
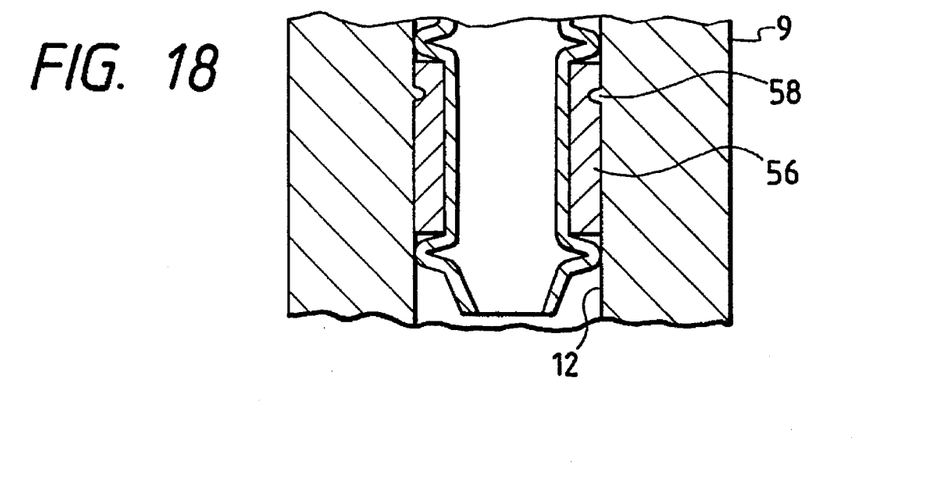
FIG. 18 is a section view of another embodiment of a sealing member employed in the invention.

Also, there can be used such a cylindrical rubber ring 56 as shown in FIG. 18. When the ring 56 is used, it is preferable that a projection 58 is provided in the communication hole 12. This structure can also secure a sufficient sealing property.

Figure 19:
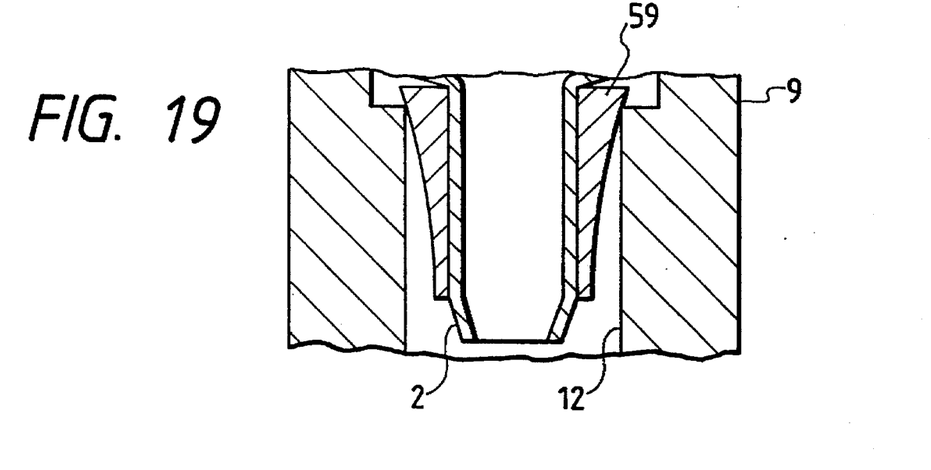
FIG. 19 is a section view of another embodiment of a sealing member employed in the invention.

There can be employed such a cylindrical rubber ring 59 as shown in FIG. 19. The ring 59 is tapered in such a manner that it is increased in thickness as it goes up toward the top thereof. With use of this structure, the elastic force of the rubber ring 59 is combined with the engaging force of the securing portion 17, especially, securing claws 18 with the upper hole portion 14, thereby being able to secure excellent sealing and fixing properties. The tapered ring 59 can also absorb a stress applied in the vertical direction in FIG. 19.

Figure 20:
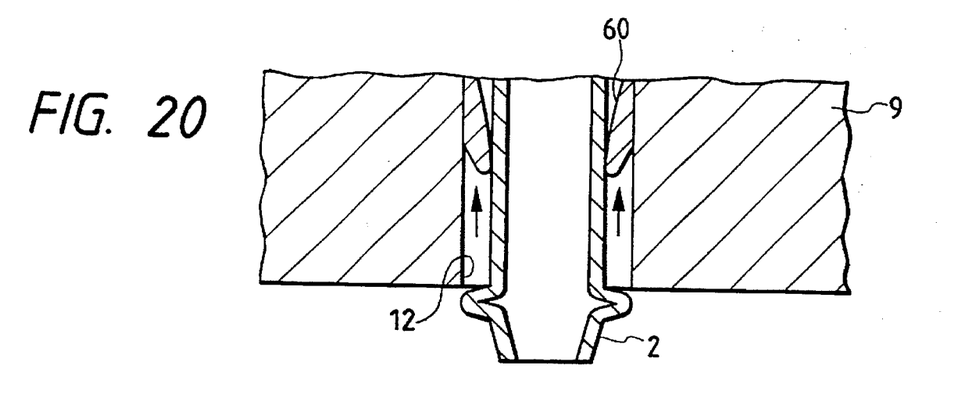
FIG. 20 is a section view of another embodiment of a sealing member employed in the invention.

Further, there can be employed such a structure as shown in FIG. 20, in which a circular rubber ring 60 is attached to the inner peripheral side of the communication hole 12. This structure can also provide a similar effect to the above-mentioned embodiments. Also, as shown in FIG. 20, when the inner peripheral side end edge of the ring 60 is bent downwardly, if the pressure in the structure is raised by the increased fuel temperature from the communication passage 11 and communication hole 12, then the pressure is applied in a direction shown by an arrow in FIG. 20. The thus applied pressure can improve the sealing force of the ring 60 further.

Figure 21:
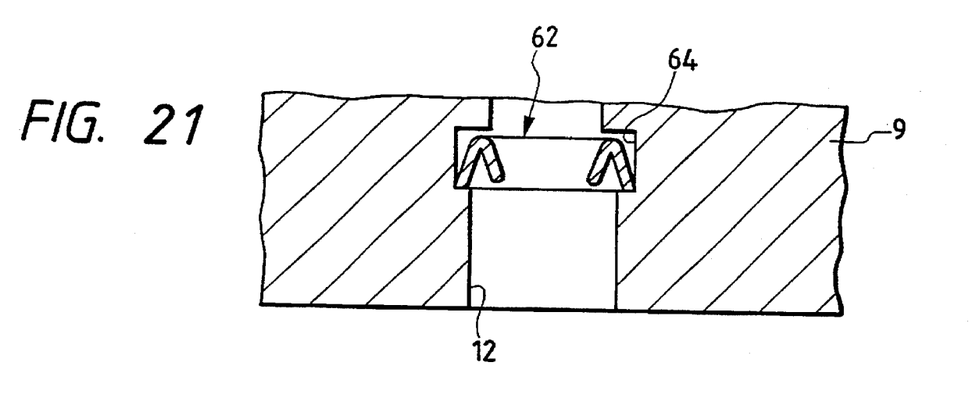
FIG. 21 is a section view of another embodiment of a sealing member employed in the invention.
Figure 22:
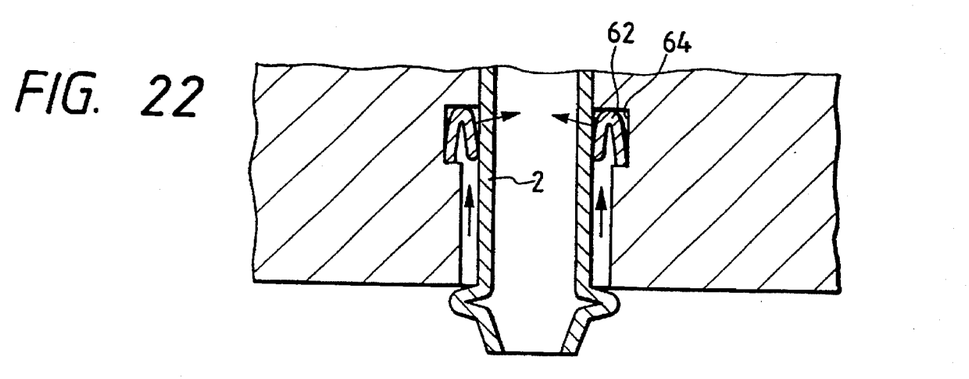
FIG. 22 is a section view of the embodiment of a sealing member shown in FIG. 21, showing an operation to be performed when the pipe is fitted from a state shown in FIG. 21.

Moreover, there can be used a structure in which such a circular rubber ring 62 as shown in FIG. 21 is stored in the undercut storage portion 64 of the delivery pipe 63. The ring 62 has a substantially inverted-V-shaped section. For this reason, as shown in FIG. 22, if the pressure in the structure is raised by the increased fuel temperature as mentioned above, then the pressure is applied in a direction of an arrow shown in FIG. 22. The thus applied pressure also pushes against the metal cap portion 2 of the pipe 1, which can further improve the sealing force of the ring 62.

In addition, as the material that forms the sealing members, there can also be employed soft resin and the like besides rubber.

There can be used a structure in which the dust cover 22 employed in the above-mentioned embodiments is omitted.

In the above-mentioned embodiments, the fixing clip 15 is formed of spring steel. However, this is not limitative but the fixing clip 15 can also be formed of any material such as stainless steel and other kinds of metal, and resin having heat resistance, and the like, provided that it has a given rigidity.

In the above-mentioned embodiments, there are shown the embodiments of the joint device which connects the fuel hose 7 with the delivery pipe 9. However, as the mating part, besides the delivery pipe 9, there can be used a fuel filter, a fuel tank and the like. Also, in place of the fuel hose 7, there can used any of various hoses such as a brake hose, a power stay hose and the like. Further, there can be used a pipe of a type that includes another metal cap portion 2 in the other end portion thereof instead of the connecting portion 6. In this case, any of various mating members can be connected to the metal cap portion 2 provided in the other end portion of the pipe.

Now, variations of the structure of the joint device of the present invention will be given below as well as the effects thereof.

In the joint device, the sealing member may be an O-ring. With use of this structure, the sealing member can be mounted easily.

In the joint device, the sealing member may be an O-ring including a spring therein. With use of this structure, the expansion and contraction forces of the sealing member are increased and the fastening force thereof is increased, which can further improve the sealing property of the sealing member.

In the joint device, the sealing member may be a cylindrical ring. With use of this structure, a sufficient sealing property can be secured.

In the joint device, the center of the securing portion or the centers of the securing claws of the securing portion may be coincident with the axis of the metal cap portion. With use of this structure, the positive fixing by the joint device can be further improved.

Now, description will be given below in detail of the invention by use of the further embodiments thereof.

Figure 23:
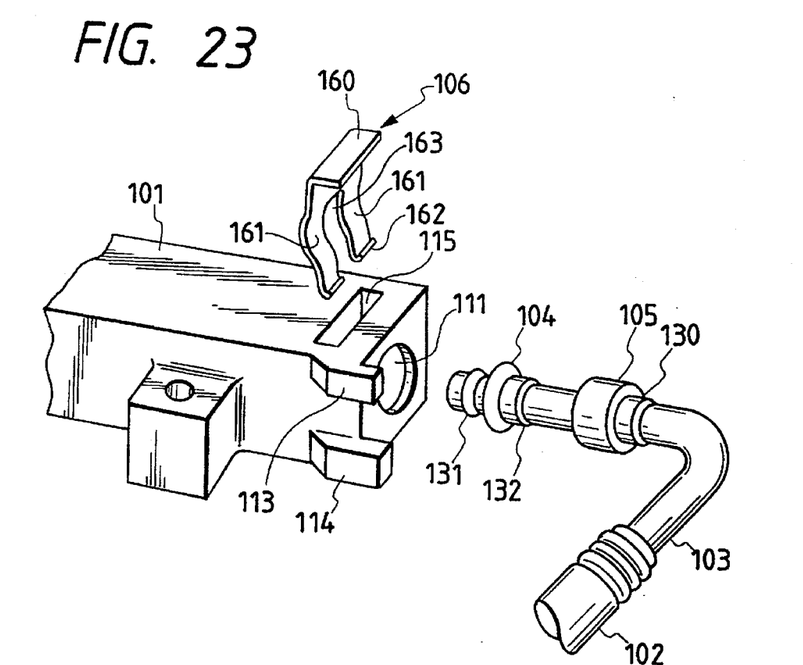
FIG. 23 is a perspective view of the whole of an embodiment of a hose joint structure according to the invention.
Figure 24:
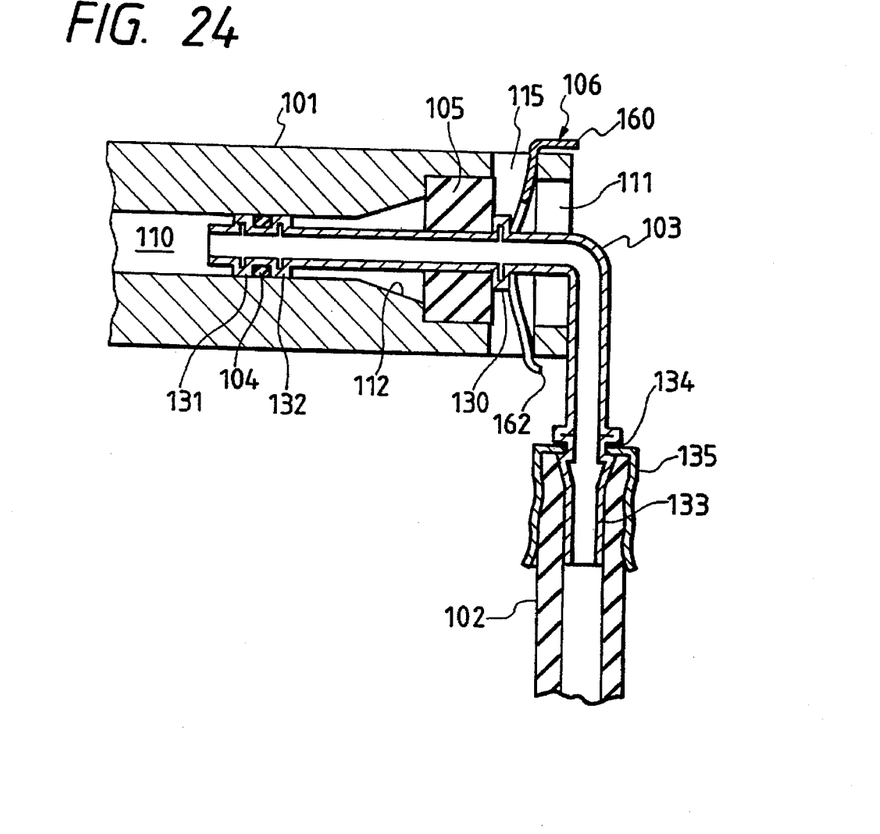
FIG. 24 is a section view of the above embodiment of a hose joint structure according to the invention.

In FIGS. 23 and 24, there is shown an embodiment of a hose joint structure according to the invention. In this embodiment, the invention is applied to a case in which a fuel hose is connected to a delivery pipe (a mating member) to supply fuel to an automotive engine.

The hose joint structure comprises a delivery pipe 101, a fuel hose 102, a pipe 103 interposed between the delivery pipe 101 and fuel hose 102, an O-ring 104 interposed between the pipe 103 and delivery pipe 101, a rubber bush 105 and a stopper 106.

The delivery pipe 101 includes a fuel passage 110 extending in the axial direction of the delivery pipe 101 as shown in FIG. 24, a large diameter portion 111 formed in the leading end portion of the fuel passage 110 and having a diameter larger than the fuel passage 110, and a tapered portion 112 increasing gradually in diameter from the fuel passage 110 toward the large diameter portion 111. Also, the delivery pipe 101 includes in the leading end thereof a pair of projections 113 and 114 respectively projecting in the axial direction of the delivery pipe 101 at a distance from each other, and, in the leading end portion thereof, a stopper hole 115 intersecting the fuel passage 110 at right angles and extending through the large diameter portion 111.

The pipe 103 is bent in a substantially L shape. And, as shown in FIG. 24, the pipe 103 includes a flange portion 130 formed at a position spaced rearwardly a given distance apart from the leading end of the pipe 103 and, in the leading end thereof, a pair of bead portions 131 and 132 arranged parallel to each other and spaced apart a given distance from each other. Also, the pipe 103 includes a nipple portion 133 and a sleeve groove 134 respectively formed in the other end portion thereof, while a sleeve 135 is held in the sleeve groove 134.

And, the nipple portion 133 is inserted into the fuel hose 102 and the sleeve 135 is staked from the outer periphery thereof, whereby the fuel hose 102 and pipe 103 can be fastened to each other.

The O-ring 104 is held between a pair of bead portions 131 and 132 and is in elastic contact with the outer peripheral surface of the pipe 103 and also with the inner peripheral surface of the fuel passage 110 of the delivery pipe 101. Also, the rubber bush 105 is inserted into the pipe 103 and is contacted with the flange portion 130, and it is also disposed within the large diameter portion 111 of the delivery pipe 101.

The stopper 106 formed of spring steel, as shown in FIG. 23, includes a head portion 160 which is bent in a manner to have an L-shaped section, a pair of leg portions 161 respectively extending from the head portion 160 in a manner to have a bent-shaped section, and two securing projections 162 respectively formed in the respective leading end portions of the leg portions 161, while a groove portion 163 is formed between the two leg portions 161.

If the stopper 106 is inserted into the stopper hole 115, then the pipe 103 is engaged with the groove portion 163 and the leg portions 161 are contacted with the rear surface of the flange portion 130 to energize the flange portion 130 forwardly. In this condition, if the head portion 160 and securing projections 162 are engaged with the opening edge of the stopper hole 115, then the stopper 106 can be fixed to the delivery pipe 101. And, the rubber bush 105 is compressed between the flange portion 130 energized forwardly by the stopper 106 and the bottom surface of the large diameter portion 111 and, due to the rubber elasticity thereof, the rubber bush 105 energizes the flange portion 130 toward the stopper 106. Therefore, the flange portion 130 is held by and between the rubber bush 105 and stopper 106, and the pipe 103 can be thereby held and fixed within the delivery pipe 101.

Accordingly, according to the hose joint structure of the present embodiment, the pipe 103 and delivery pipe 101 are sealed liquid tight by the O-ring 104. Also, since the rubber bush 105 is interposed between the pipe 103 and delivery pipe 101, vibration can be damped.

Contact of the flange portion 130 with the rubber bush 105 and stopper 106 prevents the relative axial movement of the pipe 103 and interposition of the pipe 103 between the projections 113 and 114 prevents the pipe 103 against rotation.

Figure 25A:
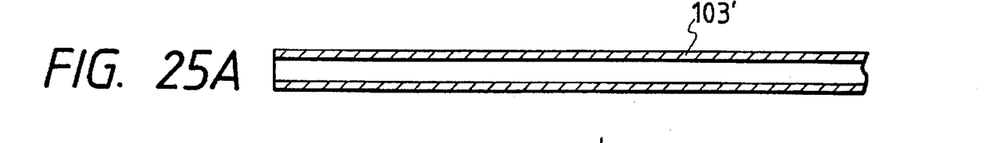
FIGS. 25A to 25E are explanatory diagrams to show a process for manufacturing a pipe used in the above embodiment of a hose joint structure according to the invention.
Figures 25B, 25C:
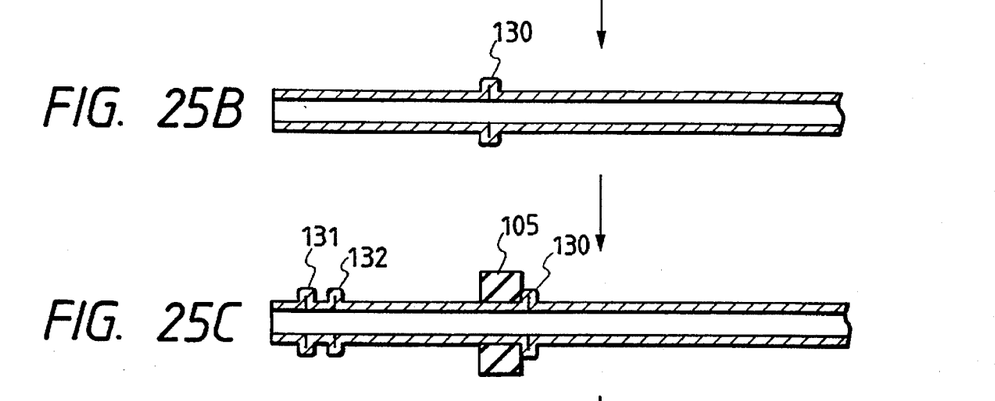
Figure 25D:
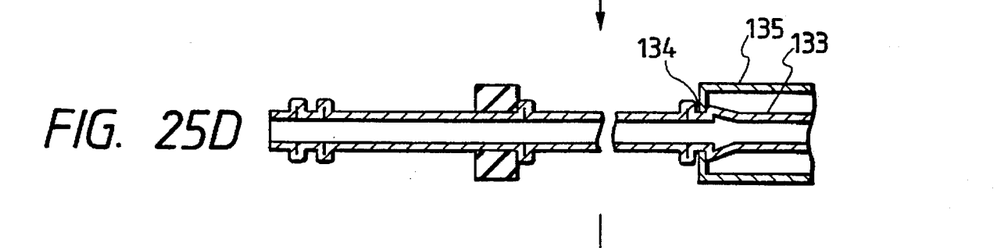

To produce the hose joint structure of the present embodiment, at first, as shown in FIGS. 25A to 25E, the pipe 103 is manufactured. In the pipe 103, after an ordinary pipe material 103' is cut to a given length (FIG. 25A), the flange portion 130 is formed by beading (FIG. 25B). Then, the rubber bush 105 is inserted into the pipe 103 from the leading end of the pipe 103 and, after then, a pair of bead portions 131 and 132 are formed in the leading end portion of the pipe 103 (FIG. 25C). On the other hand, in the other leading end portion of the pipe 103, there are formed the nipple portion 133 and sleeve groove 134 by beading and the sleeve 135 is then mounted on the pipe 103 (FIG. 25D).

Figure 25E:
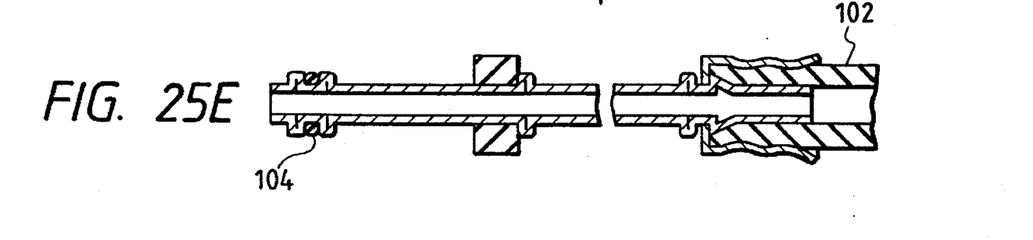

The thus obtained pipe 103 is bent into a given L shape and, after then, the nipple 133 is inserted into the fuel hose 102 and the sleeve 135 is staked, whereby the pipe 103 is fastened to the fuel hose 102. And, the O-ring 104 is mounted onto the pair of bead portions 131 and 132 and, in this condition, the pipe 103 is supplied as an assembly part (FIG. 25E).

When the assembly part is supplied to an automotive assembly line, the leading end of the pipe 103 is inserted into the delivery pipe 101 from the opening of the large diameter portion 111 thereof by an operator. In this operation, the orientation of the assembly part is adjusted so that the other end of the pipe 103 can be situated between the projections 113 and 114. Since the opening of the large diameter portion 111 is sufficiently larger than the diameter of the pipe 103, the pipe inserting operation can be performed quite easily. And, as the pipe 103 is inserted on, the O-ring 4 is gradually compressed by the tapered portion 112 and, therefore, the insertion resistance of the pipe is small and thus the pipe 103 can be inserted easily.

And, even after the rubber bush 105 is contacted with the bottom surface of the large diameter portion 111, the rubber bush 105 is pushed still further and is thus compressed to thereby be able to secure the space that allows the stopper 106 to be inserted between the rear surface of the flange portion 130 and the inner surface of the leading end side of the stopper hole 115. Then, while maintaining the pressure of the pipe 103, the stopper 106 is inserted into the stopper hole 115 and is fixed to the delivery pipe 101 by the head portion 160 and securing projections 162. After then, the pressure of the pipe 103 is removed.

As a result of this, the flange portion 130 is pushed by the stopper 106 due to the rubber elasticity of the rubber bush 105 and the flange portion 130 is also pushed by the rubber bush 105 due to the elastic force of the leg portions 161 of the stopper 106, so that the flange portion 130 can be held at a position where these two forces are balanced with each other.

In other words, according to the hose joint structure of the present embodiment, while inserting and pushing the pipe 103 into the delivery pipe 101 by one hand, the operator simply has to insert the stopper 106 into the stopper hole 115 by the other hand, thereby being able to fix the pipe 103 to the delivery pipe 101 easily without using any tool. This makes it possible to reduce the assembling operation time.

Also, if the stopper 106 is removed from the stopper hole 115, then the pipe 103 can be removed from the delivery pipe 101. This can realize a removable hose joint structure.

Further, according to the hose joint structure of the present embodiment, there is eliminated to need for provision of the conventional ring joint and bolt having a hole and, since the pipe 103 can be produced by beading a pipe material, there is eliminated the need for the man-hours for brazing and cutting operations which have been conventionally necessary for manufacture of the ring joint, the cost of the hose joint structure can be reduced down to a great extent.

Figure 26:
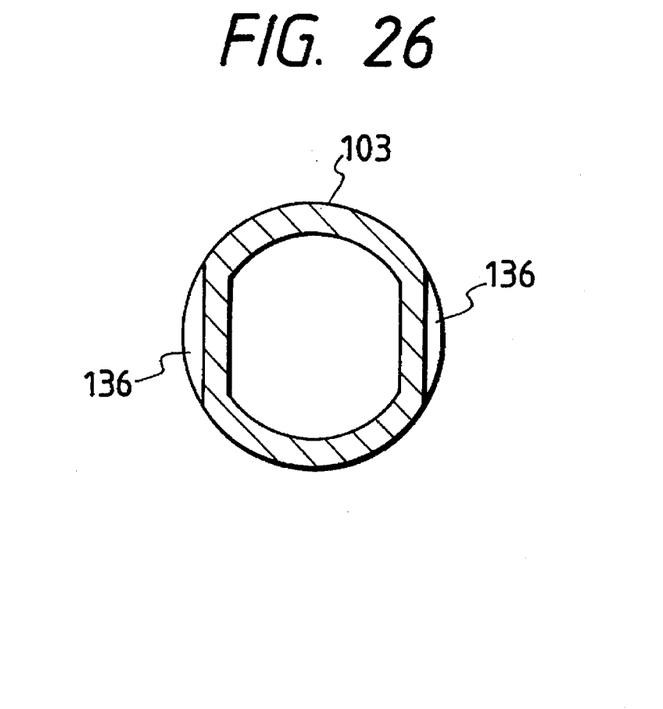
FIG. 26 is a section view of the main portions of a pipe employed in another embodiment.

Alternatively, if such two parallel grooves 136 as shown in FIG. 26 are formed on the outer peripheral surface of the pipe 103 and the pair of leg portions 161 of the stopper 106 are respectively engaged with the parallel grooves 136, then the relative movements of the pipe 103 and delivery pipe 101 in the joint structure in the rotational direction can be prevented even if the pair of projections 113 and 114 are not provided.

Figure 27:
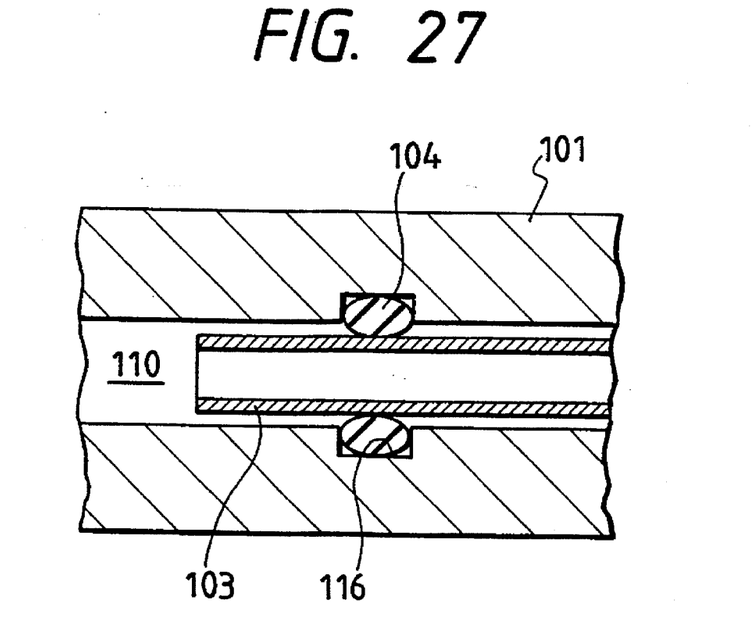
FIG. 27 is a section view of the main portions of another embodiment of a hose joint structure according to the invention.

Also, although the O-ring 104 is held by the pipe 103 in the above-mentioned embodiment, the O-ring 104 can also be held by a ring groove 116 formed in the inner peripheral surface of the delivery pipe 101, as shown in FIG. 27. In this case, there are not necessary the pair of bead portions 131 and 132 of the pipe 103.

Further, although the stopper 106 is formed separately in the above-mentioned embodiment, the stopper 106 can also be incorporated in the delivery pipe 101. In this case, simply by inserting the pipe 103 into the delivery pipe 101, they can be connected together, that is, they can be assembled with one touch.

As has been described heretofore, according to a joint device of the present invention, in a joint device connected to a mating part through a pipe, an operation efficiency in producing the joint device can be improved as well as the cost of the joint device can be reduced, while the metal cap portion of the pipe can be fixed positively to thereby be able to prevent the pipe including the metal cap portion and the like from wobbling.

Especially, even if the radius of curvature of the bent portion is small, the pipe is hard to be crashed and a sufficient space area can be secured. As a result of this, the whole joint device can be made compact.

Also, according to the invention, it is possible to prevent foreign matters such as refuse, dust and the like from entering the interior of the communication hole.

As has been described heretofore, according to the hose joint structure of the invention, the pipe and delivery pipe can be assembled together easily without use of any tool and, therefore, the man-hours for the assembling operation thereof can be reduced greatly. Also, since the pipe can be manufactured without using cutting and brazing steps, the costs of parts used can be reduced greatly.

What is claimed is:

1. A joint device comprising:

a pipe including a metal cap portion positioned at one end thereof;

a mating part including a communication hole into which said metal cap portion is fittable;

at least one sealing member respectively provided on one of the outer periphery of said metal cap portion and an inner periphery of said communication hole to provide a seal therebetween; and a mounting bracket including a mounting portion, a rotation preventing projection and a securing portion extending outwardly from said mounting portion, said mounting portion being fixed to said pipe adjacent said metal cap portion so that said metal cap portion extends beyond said securing portion, said mounting portion further including a rotation preventive recess;

said mating part further including a first recess adjacent said communication hole and a second recess spaced from said first recess so that when said mounting bracket is placed thereon to thereby locate and secure said metal cap portion within said communication hole, said first recess receives said securing portion and said rotation preventing projection is received in said second recess, and wherein said pipe includes a small diameter part about which said mounting portion is fixed and a second rotation preventive projection that is received in said rotation preventive recess.

2. A joint device as set forth in claim 1, wherein said mounting portion is fixed to said pipe by two upper and lower increased diameter portions relative to said small diameter part and respectively formed integrally with said pipe at positions thereof situated just above and below said mounting portion.

3. A joint device as set forth in claim 1, wherein said pipe further includes a bent portion and at least said bent portion is so formed as to have a substantially square cross section.

4. A joint device as set forth in claim 1, wherein said pipe further includes a dust cover mounted on said pipe above said mounting bracket and extending outwardly therebeyond.

5. A joint device as claimed in claim 1, wherein said mounting portion includes a mounting ring having a substantially C-shaped cross-sectional shape and said mounting ring being open at one end thereof, said pipe further including a pair of crown portions serving as a pair of upper and lower increased diameter portions relative to said small diameter part between which said mounting ring is received, and a pair of projections respectively extending in the downward and upward directions from the crown portions, the projections respectively have a width substantially equal to that of said open end in said mounting ring.

6. A joint device as claimed in claim 1, wherein said at least one sealing member comprises an O-ring having a ring main body formed of rubber and spring embedded in the ring main body.

7. A joint device as claimed in claim 1, wherein said at least one sealing member comprises a cylindrical rubber ring that intersects a radially outwardly directed projection provided in the communication hole.

8. A joint device as claimed in claim 1, wherein said at least one sealing member comprises a tapered cylindrical rubber ring.

9. A joint device as claimed in claim 1, wherein said at least one sealing member comprises a circular rubber ring attached to the inner periphery of the communication hole.

10. A joint device as claimed in claim 1, wherein said at least one sealing member comprises a circular rubber ring having a substantially inverted-V-shaped section, which is retained in an undercut portion of said mating part.

* * * * *